(12) United States Patent
Yamaguchi et al.

(10) Patent No.: US 11,876,359 B2
(45) Date of Patent: Jan. 16, 2024

(54) WIRING MEMBER INTEGRATED MODULE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Koji Yamaguchi, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 252 days.

(21) Appl. No.: 17/426,452

(22) PCT Filed: Jan. 20, 2020

(86) PCT No.: PCT/JP2020/001692
§ 371 (c)(1),
(2) Date: Jul. 28, 2021

(87) PCT Pub. No.: WO2020/162150
PCT Pub. Date: Aug. 13, 2020

(65) Prior Publication Data
US 2022/0109290 A1 Apr. 7, 2022

(30) Foreign Application Priority Data
Feb. 8, 2019 (JP) .................................. 2019-021231

(51) Int. Cl.
*H02G 3/30* (2006.01)
*H02G 3/04* (2006.01)
*B60R 16/02* (2006.01)

(52) U.S. Cl.
CPC ....... *H02G 3/0456* (2013.01); *B60R 16/0215* (2013.01); *H02G 3/30* (2013.01)

(58) Field of Classification Search
CPC ..... H02G 3/0456; H02G 3/30; B60R 16/0215
(Continued)

(56) References Cited

U.S. PATENT DOCUMENTS 4,711,052 A * 12/1987 Maeda ................... B60J 5/0463
49/502
4,869,670 A * 9/1989 Ueda ................... B60R 16/0207
296/146.7
(Continued)

FOREIGN PATENT DOCUMENTS

JP 63-131516 U 8/1988
JP 11-198742 7/1999
(Continued)

OTHER PUBLICATIONS

Japan Office Action issued in Japan Patent Application No. 2019-21231, dated Mar. 1, 2022, together with English translation thereof.
(Continued)

*Primary Examiner* — Timothy J Thompson
*Assistant Examiner* — Michael F Mcallister
(74) *Attorney, Agent, or Firm* — GREENBLUM & BERNSTEIN, P.L.C.

(57) ABSTRACT

An object of the present disclosure is to provide a technique capable of holding a wiring member in a bended state. A wiring member integrated module includes: a wiring member, a first base member including an arrangement target part holding a part of the wiring member; and a second base member whose state can be changed from a first state where a part of the wiring member extending from the arrangement target part is held on an extension of the arrangement target (Continued)

part to a second state where the part is held in a bended state with respect to the arrangement target part.

19 Claims, 16 Drawing Sheets

(58) Field of Classification Search
USPC .......................................................... 174/480
See application file for complete search history.

(56) References Cited

U.S. PATENT DOCUMENTS

| | | | | | |
|---|---|---|---|---|---|
| 5,405,672 | A | * | 4/1995 | Takiguchi | B60R 16/0222 |
| | | | | | 428/161 |
| 5,460,530 | A | * | 10/1995 | Toba | B60R 16/0207 |
| | | | | | 174/72 A |
| 5,918,365 | A | * | 7/1999 | Uchida | H02B 1/202 |
| | | | | | 174/72 A |
| 6,051,790 | A | * | 4/2000 | Takeuchi | B60R 16/0207 |
| | | | | | 174/72 A |
| 6,135,538 | A | * | 10/2000 | Serizawa | B60R 16/0207 |
| | | | | | 174/64 |
| 6,462,279 | B1 | * | 10/2002 | Serizawa | B60Q 3/51 |
| | | | | | 174/72 A |
| 9,914,409 | B2 | * | 3/2018 | Osada | B60R 16/0207 |
| 2004/0120541 | A1 | * | 6/2004 | Maekawa | H04R 1/025 |
| | | | | | 381/87 |

FOREIGN PATENT DOCUMENTS

| | | |
|---|---|---|
| JP | 11-215660 | 8/1999 |
| JP | 2009-268272 | 11/2009 |

OTHER PUBLICATIONS

International Search Report issued in International Patent Application No. PCT/JP2020/001692, dated Mar. 24, 2020, along with an English translation thereof.

U.S. Appl. No. 17/427,445 to Koji Yamaguchi et al., filed Jul. 30, 2021.

* cited by examiner

F I G. 1 5
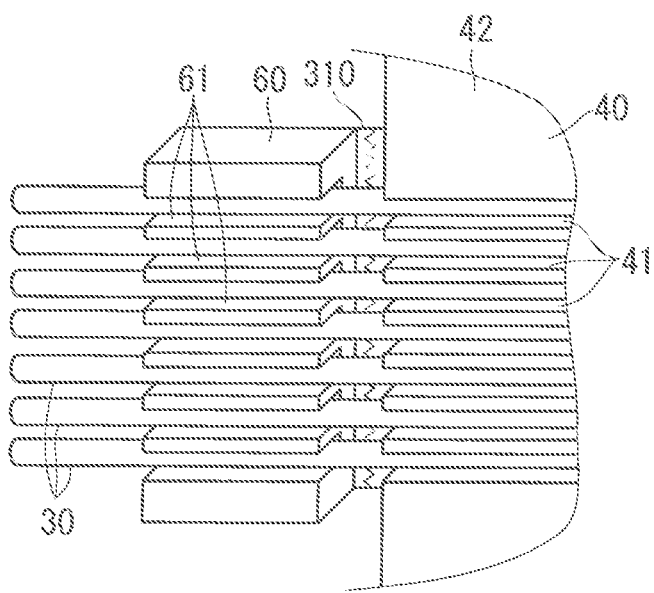

WIRING MEMBER INTEGRATED MODULE

TECHNICAL FIELD

The present disclosure relates to a wiring member integrated module.

BACKGROUND ART

Patent Document 1 discloses a routing structure of a door harness of an automobile. In this routing structure, the door harness is routed along a main surface of a door trim.

PRIOR ART DOCUMENTS

Patent Documents

Patent Document 1: Japanese Patent Application Laid-Open No. 11-198742

SUMMARY

Problem to be Solved by the Invention

However, an arrangement target part of a harness is bended in the door trim, it is difficult to arrange the door harness along the arrangement target part.

Accordingly, an object of the present disclosure is to provide a technique capable of holding a wiring member in a bended state.

Means to Solve the Problem

A wiring member integrated module according to the present disclosure includes: a wiring member, a first base member including an arrangement target part holding a part of the wiring member, and a second base member whose state can be changed from a first state where a part of the wiring member extending from the arrangement target part is held on an extension of the arrangement target part to a second state where the part is held in a bended state with respect to the arrangement target part.

Effects of the Invention

According to the present disclosure, the wiring member can be easily held in the bended state.

BRIEF DESCRIPTION OF DRAWINGS

FIG. 15 is a perspective view illustrating a portion of connecting the first base member and the second base member according to a third modification example.

DESCRIPTION OF EMBODIMENT(S)

[Description of Embodiment of Present Disclosure]

Figure 1:
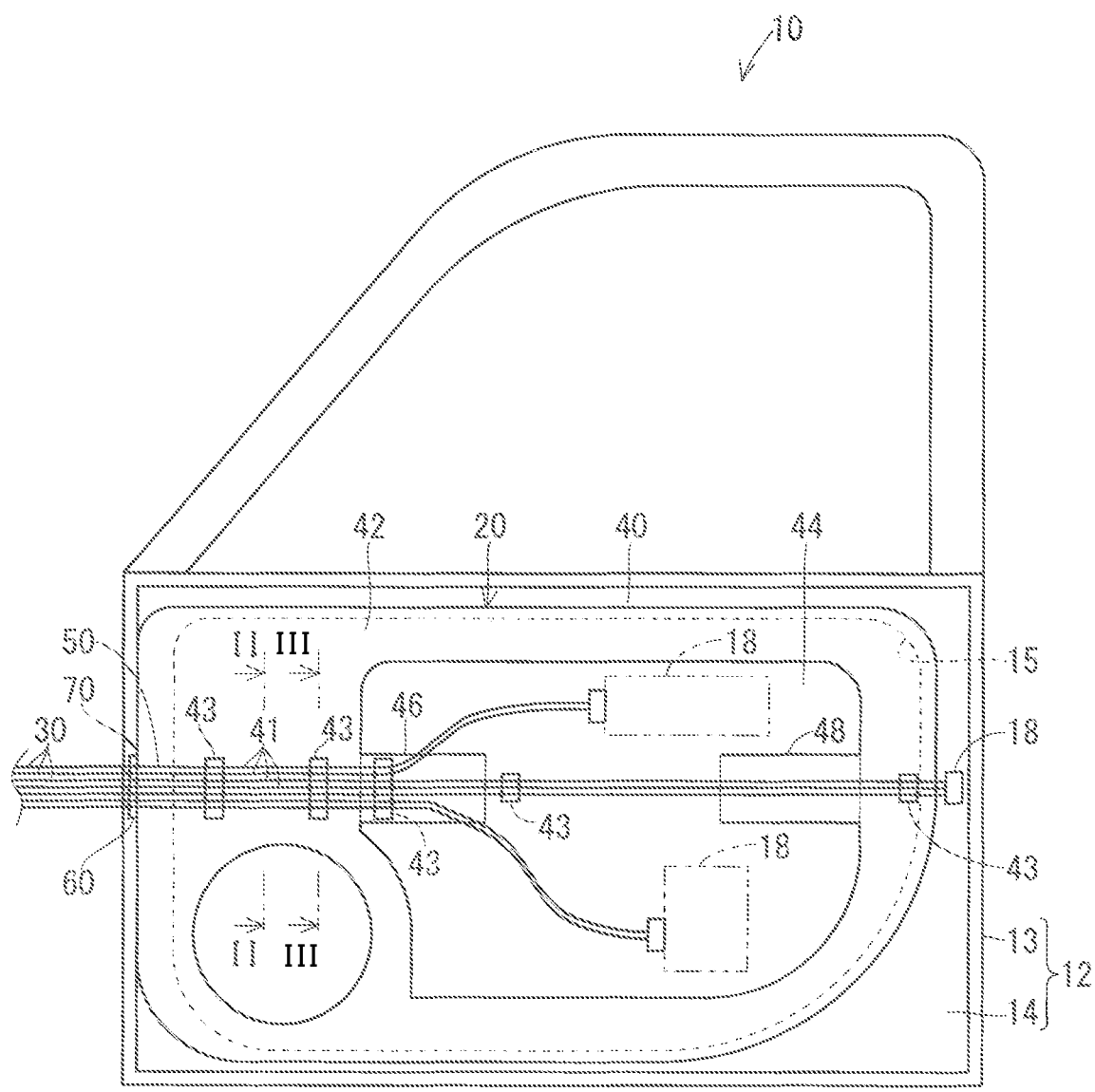
FIG. 1 is a side view illustrating a wiring member integrated module according to an embodiment.

Embodiments of the present disclosure are listed and described firstly.

A wiring member integrated module according to the present disclosure is as follows.

(1) A wiring member integrated module includes: a wiring member, a first base member including an arrangement target part holding a part of the wiring member; and a second base member whose state can be changed from a first state where a part of the wiring member extending from the arrangement target part is held on an extension of the arrangement target part to a second state where the part is held in a bended state with respect to the arrangement target part.

In a state where the second base member is kept in the first state, the part of the wiring member extending from the arrangement target part is held on the extension of the arrangement target part by the second base member. Thus, the wiring member is easily held by the arrangement target part of the first base member and the second base member. When the state of the second base member is changed to the second state in a state where the wiring member is held by the first base member and the second base member, the wiring member is held in a bended state. Thus, the wiring member can be easily held in the bended state.

(2) The first base member may be a panel component incorporated into a door of a vehicle.

Accordingly, the wiring member is easily held in the bended state with respect to the panel component incorporated into the door.

(3) The wiring member integrated module may further include a hinge part bendably connecting the second base member to the first base member.

The first base member and the second base member are connected to each other via the hinge part, thus the wiring member is easily held by the first base part and the second base part. The second base member is bended with respect to the first base member, thus a posture of the second base member is easily changed from the first state to the second state.

(4) In the first state, the first base member and the second base member may be connected to each other via a weakened part which can be fractured more easily than the other part.

The first base member and the second base member are connected to each other via the weakened part, thus the wiring member is easily held by the first base part and the second base part. When the weakened part is fractured, the state of the second base member is easily changed to the second state.

(5) In the second state, fracture traces may be formed in the first base member and the second base member, respectively.

The first base member and the second base member are connected before the fracture, thus the wiring member is easily held by the first base part and the second base part. When the first base member and the second base member are fractured, the state of the second base member is easily changed to the second state.

(6) The wiring member integrated module may further include a fixing part for keeping the second base member in the second state with respect to the first base member.

The second base member is kept in the second state by the fixing part.

(7) The fixing part may include a base member fixing part fixing the second base member to the first base member.

The second base member is kept in the second state by the base member fixing part.

(8) The base member fixing part may include a locking protrusion part formed to protrude from one of the first base member and the second base member and a locking receiving part formed on the other one of the first base member and the second base member to fit the locking protrusion part therein.

The locking protrusion part is fit in the locking receiving part, thus the second base member is kept in the second state.

(9) The fixing part may include a fixing target component fixing part provided in the second base member and fixed to a fixing target component of the first base member.

When the fixing target component fixing part is fixed to the fixing target component, the second base member is kept in the second state.

(10) The fixing target component fixing part may be a part screwed to the fixing target component.

The second base member is kept in the second state by a screw fixation.

[Details of Embodiment of Present Disclosure]

Specific examples of a wiring member integrated module of the present disclosure are described hereinafter with reference to the drawings. The present invention is not limited to these examples, but is indicated by claims, and it is intended that meanings equivalent to claims and all modifications within a scope of claims are included.

[Embodiment]

Figure 2:
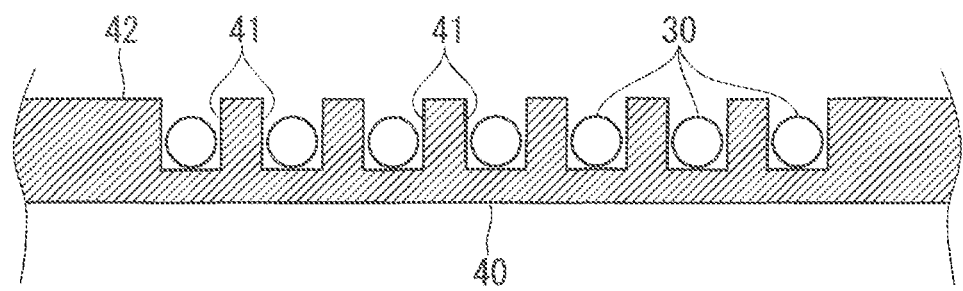
FIG. 2 is a II-II line cross-sectional view in FIG. 1.
Figure 3:
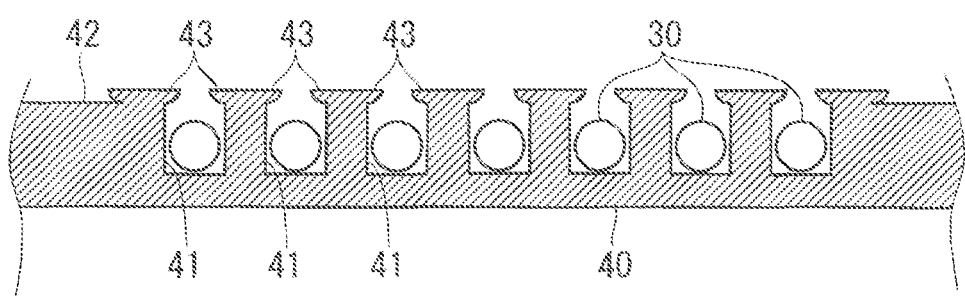
FIG. 3 is a III-III line cross-sectional view in FIG. 1.

A wiring member integrated module according to embodiments is described hereinafter. FIG. 1 is a side view illustrating a wiring member integrated module 20, FIG. 2 is a II-II line cross-sectional view in FIG. 1, and FIG. 3 is a III-III line cross-sectional view in FIG. 1.

Described herein as an example is the wiring member integrated module 20 incorporated into a door 10 in a vehicle. The door 10 is formed into a flat shape as a whole, and is a part openable and closable to partition an inner side and outer side of a vehicle. The door 10 is assumed to be a driver side door, a passenger's side door, and a rear seat door, for example. The wiring member integrated module may be adopted to a panel provided in a roof and incorporated into a vehicle in a bended state.

The door 10 includes a metal panel 12 and the wiring member integrated module 20.

The metal panel 12 includes a metal outer panel 13 and a metal inner panel 14. The metal outer panel 13 is provided in a part of the door 10 facing the outer side of the vehicle to constitute an appearance of the vehicle together with a metal body. The metal inner panel 14 is provided on a side of a vehicle interior of the metal outer panel 13. An opening 15 is provided in the metal inner panel 14. The wiring member integrated module 20 is attached to the opening 15 to close the opening 15.

The wiring member integrated module 20 includes a wiring member 30, a first base member 40, and a second base member 60.

The first base member 40 is a flat part spreading to the same extent or larger than the opening 15. The first base member 40 is attached to the opening 15 of the metal inner panel 14 to cover the opening 15. Accordingly, the first base member 40 can partition the inner side and outer side of the vehicle. That is to say, the first base member 40 is an example of a panel component incorporated into the door 10 of the vehicle. The first base member 40 is attached to the opening 15 of the metal inner panel 14, and such an attachment state is kept by a screw clamp or a locking structure, for example. For example, when a part of a peripheral part of the first base member 40 overlapping with the metal inner panel 14 is screwed to the metal inner panel 14 using a screw, for example, a gap therebetween can be practicably covered.

A space is formed between the metal outer panel 13 and the first base member 40 and between the metal inner panel 14 and the first base member 40 in the state where the first base member 40 is attached to the metal inner panel 14. A window of the door can be housed in this space. A window exposed to a rainwater environment is housed in the space, and a slit-like opening through which the window goes in and out is formed on an upper side of the space. Thus, the space is a space which water may enter. The space is a space which may be connected to an outer space, thus is also a space which a wind noise, for example, may enter from outside.

Thus, the first base member 40 is provided as a member for completely partitioning a vehicle interior space and an outer space with the metal inner panel 14.

More specifically, herein, the first base member 40 is a part made up of molded resin (polypropylene), for example. The first base member 40 includes a plate-like part 42 and a housing space forming part 44.

The plate-like part 42 is a part spreading into a plate-like shape with a sufficient size for covering the opening 15. The housing space forming part 44 is opened on a side of one main surface (a side of the vehicle interior) of the plate-like part 42, and is formed into a container shape protruding to a side of the other main surface (outside) of the plate-like part 42. The housing space forming part 44 is formed into a container shape smaller than the opening 15.

The housing space forming part 44 is disposed in the opening 15 in a state where the first base member 40 is fitted in the opening 15 in the metal inner panel 14. The plate-like part 42 covers a part between an opening edge portion of the housing space forming part 44 and a peripheral edge portion of the opening 15.

An electrical component 18 incorporated into the door 10 is incorporated into the housing space forming part 44 in the first base member 40, for example. The electrical component 18 is assumed to be a motor opening and closing the window, an actuator for locking and unlocking the door 10, and various switches, for example.

Wiring support protrusion parts 46 and 48 are provided to protrude from a part of an outer periphery of the housing space forming part 44 in the first base member 40 toward an inner side of the housing space forming part 44.

One wiring support protrusion part 46 is provided to protrude from a front part which is a part of the outer periphery of the housing space forming part 44 toward the inner side of the housing space forming part 44 to extend along a front-back direction. The front or the back indicates a front or a back based on a vehicle. The wiring support protrusion part 46 has an inclined surface whose height dimension gradually reduces from one main surface of the plate-like part 42 toward an inner surface of a bottom of the housing space forming part 44.

The other wiring support protrusion part 48 is provided to protrude from a back part (a back side part of the vehicle) which is a part of the outer periphery of the housing space forming part 44 toward the inner side of the housing space forming part 44. When the first base member 40 is viewed from the side of the vehicle interior, one wiring support protrusion part 46 and the other wiring support protrusion part 48 are formed along the front-back direction of the vehicle. The wiring support protrusion part 48 has an inclined surface whose height dimension gradually decreases from one main surface of the plate-like part 42 toward an inner surface of a bottom of the housing space forming part 44.

A speaker incorporating hole for incorporating a speaker is formed in plate-like part 42. It is not necessary to form the speaker incorporating hole in the first base member 40. For example, it is also applicable that a speaker incorporating hole is formed in a metal inner panel and the first base member 40 is incorporated into a region except for a part where a speaker is incorporated into the metal inner panel.

A part of the plate-like part 42 on a side of one main surface (inner side surface of the vehicle interior) constitutes an arrangement target part 50 holding a part of the wiring member 30. Herein, the arrangement target part 50 is a part in which a wiring member housing groove 41 is formed in a part spreading into a plate-like shape, and wholly spreads into a plate-like shape. Herein, the wiring member housing groove 41 is formed at least in the plate-like part 42 in one main surface of the first base member 40. A part of the wiring member 30 in an extension direction thereof is housed in the wiring member housing groove 41 and held by the first base member 40.

More specifically, the wiring member housing groove 41 is formed along an arrangement path of the wiring member 30 on the first base member 40. Herein, a plurality of wiring member housing grooves 41 are formed in the first base member 40. More specifically, the plurality of wiring member housing grooves 41 are formed along the front-back direction of the vehicle from a front part to a back part of the first base member 40. A part of the plurality of wiring member housing grooves 41 is formed straight from the front part to the back part of the first base member 40, and the other part of the wiring member housing groove 41 is formed to be curved to an upper side or a lower side in a midway portion from the front part to the back part of the first base member 40.

The plurality of wiring member housing grooves 41 are formed with a space therebetween and extend in a parallel state. Each wiring member housing groove 41 is formed into a groove-like shape capable of housing the wiring member 30 one by one. A width of the wiring member housing groove 41 is preferably equal to or larger than an outer diameter of the wiring member 30. A depth of the wiring member housing groove 41 is preferably equal to or larger than an outer diameter of the wiring member housing groove 41.

The plurality of wiring member housing grooves 41 start from the front part of the first base member 40 by reason that the front part of the door 10 is normally connected to a vehicle via a hinge, and the wiring member 30 from the vehicle is lead from the front part of the door 10 into the door 10.

The wiring member 30 is a wire-like member transmitting electrical power or light, for example. The wiring member 30 is provided in the door 10 and connected to a component provided in the door 10. The wiring member 30 may be a general wire having a core wire and a covering around the cores wire, or may also be a bare lead wire, a shielded wire, a twist wire, an enamel wire, a nichrome wire, or an optical fiber, for example. The wiring member transmitting the electrical power may be various kinds of signal lines or various kinds of power lines. The wiring member 30 may be a single wire-like object or a composite object of a plurality of wire-like objects (a twisted wire, a cable made up of a plurality of wire-like objects covered by a sheath, a plurality of electrical wires fixed to a sheet in a parallel stale). Description herein is based on an assumption that the wiring member 30 is a covering wire.

Herein, a plurality of wiring members 30 are held by the first base member 40 in a state of being housed one by one in the plurality of wiring member housing grooves 41 described above. One end portions of the plurality of wiring members 30 extend from the front part of the first base member 40 and is held by the second base member 60. The other end portion of the plurality of wiring members 30 pass through the wiring member housing groove 41 and are led to the back part of the first base member 40, and are taken out of the wiring member housing groove 41 in a position appropriate for a connection to the electrical component 18 which is a connection destination, thereby being connected to the electrical component 18. A connector is attached to the other end portion of the wiring member 30, and the wiring member 30 may be connected to the electrical component 18 via the connector.

In the present embodiment, the plurality of wiring members 30 are individually housed in the wiring member housing groove 41, however, all the plurality of wiring members may be housed and held in a common wiring member housing groove. It is also applicable that the plurality of electrical wirings 30 are divided into a plurality of groups, the wiring member housing grooves in number corresponding to the plurality of groups are formed, and the plurality of electrical wirings are housed and held in the plurality of wiring member housing grooves for each of the plurality of groups.

A hot-melt crush part 43 preventing the wiring member 30 from coming outside is formed in an opening in the wiring member housing groove 41 on a side opposite to a bottom portion thereof (refer to FIG. 1 and FIG. 3). Herein, the plurality of hot-melt crush parts 43 are formed at intervals in an extension direction of the wiring member housing groove 41 in a middle portion in the extension direction of the wiring member housing groove 41.

The hot-melt crush part 43 is made by forming a part located on a peripheral edge portion of the opening part of the wiring member housing groove 41 on the side opposite to the bottom thereof to protrude to the side opposite to the bottom, and melting and crushing the protruding part by heat to narrow or close the opening part.

The hot-melt crush part 43 described above narrows or closes the opening of the wiring member housing groove 41, but is not welded to the wiring member 30 housed therein. Accordingly, the wiring member 30 is held in the wiring member housing groove 41 to be movable along the extension direction thereof.

However, the hot-melt crush part 43 may be welded to the wiring member 30. It is also applicable to fill the wiring member housing groove 41 with a filling material (a melted resin or an adhesive agent, for example) and solidify the filling material, thereby holding the wiring member 30 in the wiring member housing groove 41. It is also applicable that the wiring member housing groove 41 is not formed in the first base member 40 but the wiring member is directly bonded or welded to the first base member, or fixed via an adhesive tape, for example. Also applicable is a configuration that a clip member (also referred to as a clamp) is attached to the wiring member by a belt or an adhesive tape, for example, and fitted in the first base member 40 so that the first base member 40 holds the wiring member, for example.

Figure 4:
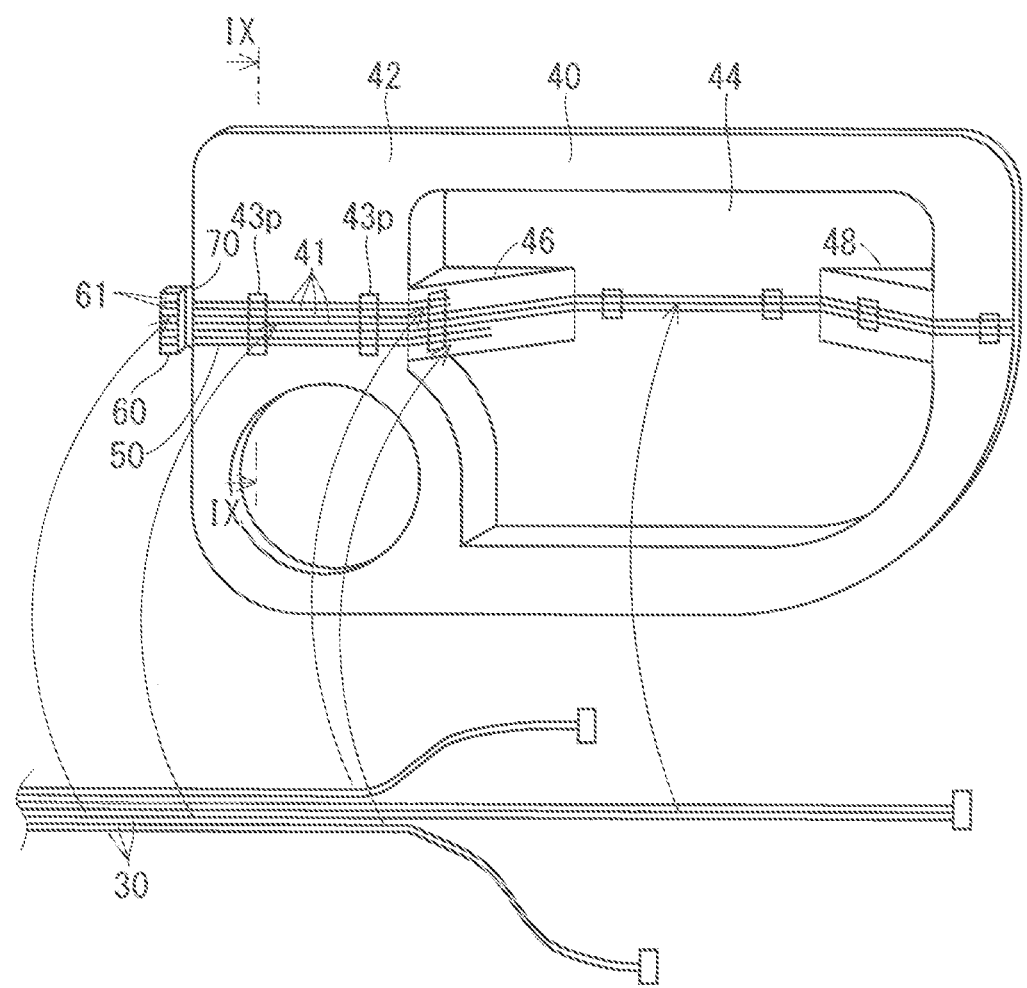
FIG. 4 is a perspective view illustrating a state before incorporating a wiring member into a first base member and a second base member.
Figure 5:
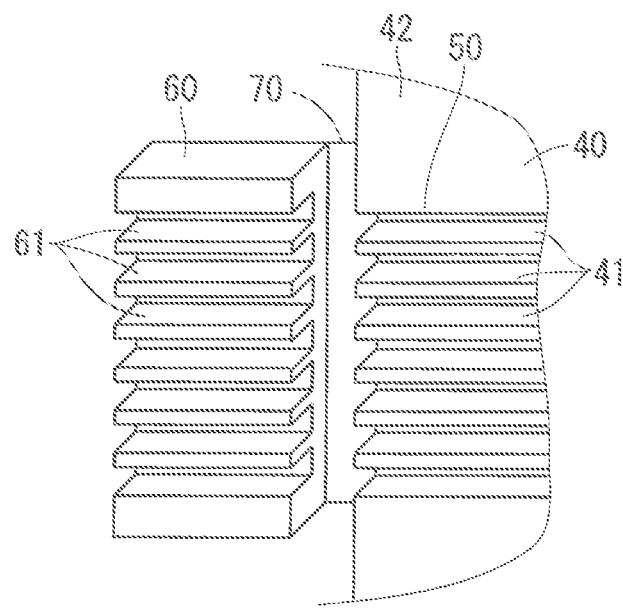
FIG. 5 is a partial enlarged perspective view of FIG. 4.
Figure 6:
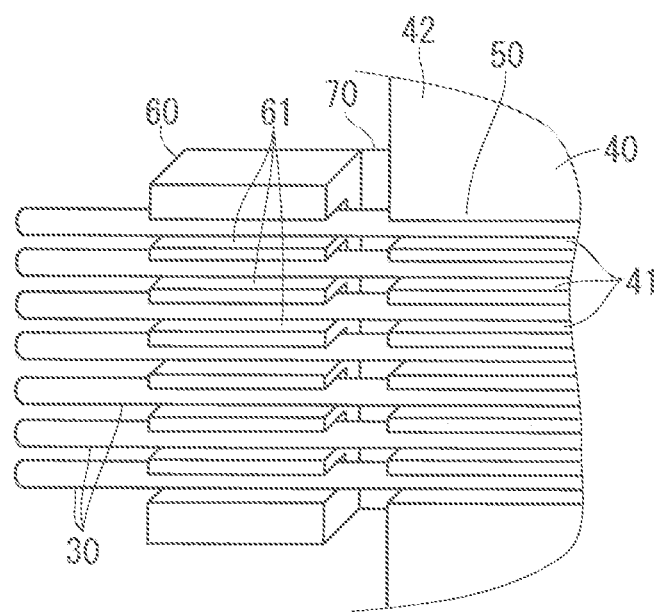
FIG. 6 is an enlarged perspective view illustrating a state of holding the wiring member in the first base member and the second base member in FIG. 5.
Figure 7:
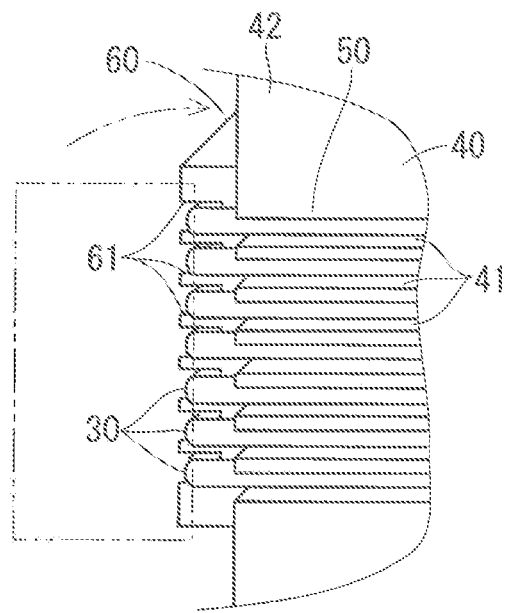
FIG. 7 is tin enlarged perspective view illustrating the second base member in a bended state.
Figure 8:
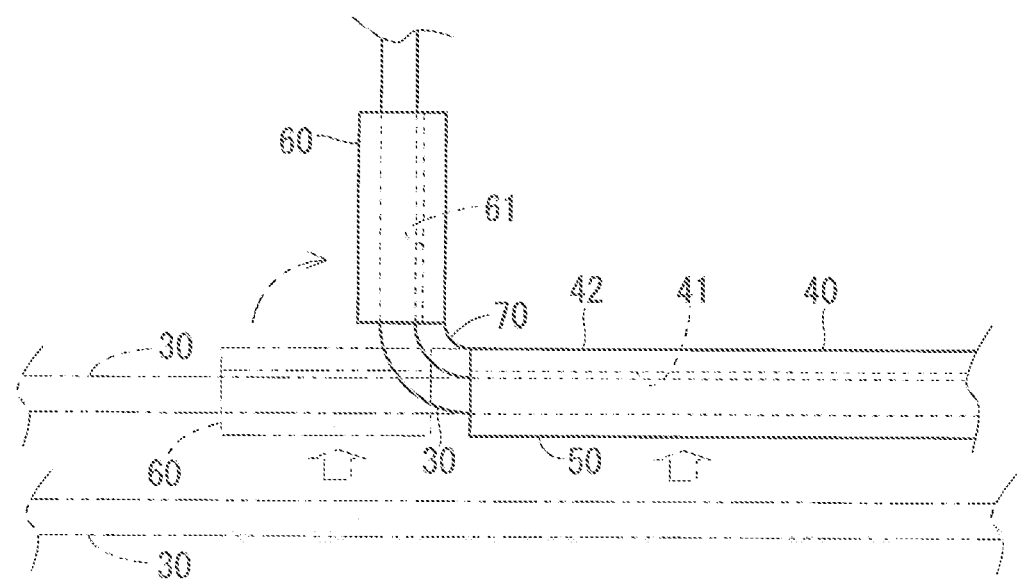
FIG. 8 is an explanation view illustrating a process of bending the second base member.

FIG. 4 is a perspective view illustrating a state before incorporating the wiring member 30 into the first base member 40 and the second base member 60, FIG. 5 is a partial enlarged perspective view of FIG. 4, FIG. 6 is an enlarged perspective view illustrating a state of holding the wiring member 30 in the first base member 40 and the second base member 60 in FIG. 5, FIG. 7 is an enlarged perspective view illustrating the second base member 60 in a bended state, and FIG. 8 is an explanation view illustrating a process of bending the second base member 60 in the state where the first base member 40 and the second base member 60 hold the wiring member 30.

The wiring member 30 extends from a part of the first base member 40 in a circumferential direction, herein, the front part of the first base member 40.

The second base member 60 holds the part of the wiring member 30 extending from the arrangement target part 50, and the state can be changed from the first state to the second state in this holding state. The first state is a state in which the part of the wiring member 30 extending from the arrangement target part 50 is held on an extension of the arrangement target part 50. In other words, when a boundary between the first base member 40 and the second base member 60 is assumed, the wiring member 30 is held in the same plane in a part of the first base member 40 adjacent to the boundary and a part of the second base member 60 adjacent to the boundary. The second state is a state in which the part of the wiring member 30 extending from the arrangement target part 50 is held in a bended state with respect to the arrangement target part 50. In the second state, the wiring member 30 is held in a state of being bended at 90-degree angle or more with respect to the arrangement target part 50 In other words, the wiring member 30 is held in a bended state between the first base member 40 and the second base member 60.

More specifically, the second base member 60 is connected to the first base member 40 via a hinge part 70. The hinge part 70 is a part thinner than the first base member 40 and the second base member 60. Thus, the second base member 60 can be bended with respect to the first base member 40 by bending the hinge part 70. The first base member 40, the second base member 60, and the hinge part 70 may be an integrally molded member made of resin, for example. In an initial state of being molded, the second base member 60 may be formed in a state of being connected to the first base member 40 on the same plane.

The part of the wiring member 30 extending from the arrangement target part 50 is partially held in the second base member 60. Herein, a wiring member storage groove 61 is formed in one main surface of the second base member 60. A part of the wiring member 30 in the extension direction thereof is housed in the wiring member storage groove 61 and held by the second base member 60.

More specifically, the wiring member housing groove 61 is formed in an extension of a front part of the wiring member housing groove 41 formed in the first base member 40. Herein, the plurality of wiring member housing grooves 41 are formed, thus the plurality of wiring member housing groove 61 are formed on the extension on the front side of the plurality of wiring member housing grooves 41. A space for placing the hinge part 70 is provided between the first base member 40 and the second base member 60. The plurality of wiring member housing grooves 61 are formed straight, and in the first state described above, the plurality of wiring member housing grooves 41 and the plurality of wiring member housing grooves 61 extend in a straight form. A preferable example of a width and a depth of the wiring member housing groove 61 is similar to that of the plurality of wiring member housing grooves 41 described above.

The configuration of holding the wiring member 30 in the first base member 40 described above can be applied as a configuration of holding the wiring member 30 in the second base member 60. For example, it is applicable that a protruding part formed on the second base member 60 is thermally melted and crushed in the state where the wiring member 30 is housed in the wiring member housing groove 61 to house the wiring member 30 in the wiring member housing groove 61. The second base member 60 has a width smaller than the first base member 40, thus an adhesive tape may be wound around the whole second base member 60 and wiring member 30 in the state where the wiring member 30 is housed in the wiring member housing groove 61 in the second base member 60.

The second base member 60 is connected to the first base member 40 via the hinge part 70, thus the state of the second base member 60 can be changed between a state of being disposed along the extension of the arrangement target part 50 in the first base member 40 and a state of being bended with respect to the arrangement target part 50. The state where the second base member 60 is disposed along the extension of the arrangement target part 50 in the first base member 40 is a first state where the part of the second base member 60 holds the part of the wiring member 30 extending from the arrangement target part 50 on the extension of the arrangement target part 50. The state where the second base member 60 is bended with respect to the arrangement target part 50 in the first base member 40 (particularly the state where the second base member 60 is bended in a direction opposite to the direction in which the arrangement target part 50 is directed) is a second state where the second base member 60 holds the part of the wiring member 30 extending from the arrangement target part 50 in the bended state with respect to the arrangement target part 50. Then, the second base member 60 is bended at the hinge part 70 with respect to the first base member 40, thus the state of the second base member 60 is changed from the first state to the second state.

The state of the second base member 60 is changed to the second state in the state where the first base member 40 is incorporated into the door 10, thus the wiring member 30 is disposed along an outward side surface of the metal panel 12, herein, an outward side surface located on a front side of the metal panel 12. That is to say, the second base member 60 is used as a member holding the wiring member 30 along a predetermined route in the outward side surface of the metal panel 12. The wiring member 30 held by the second base member 60 passes close to the hinge fixing the door 10 to the vehicle and is led inside the vehicle, thereby being connected to an electrical component, for example, on a side of the vehicle body. The wiring member 30 does not pass through the metal panel 12 of the door 10 but passes through an outer side surface and is disposed, thus there is an advantage that a hole for passing the wirings needs not be formed in the door 10. When the hinge part 70 can be freely bended to some extent, an error is absorbed by the hinge part 70 even if the error occurs between a position where the first base member 40 is fixed and a position where the second base member 60 is fixed in a fixing target component.

An example of manufacturing the present wiring member integrated module 20 is described.

Firstly, the wiring member 30, the first base member 40, and the second base member 60 are prepared (refer to FIG. 4). As described above, the first base member 40 and the second base member 60 are manufactured as an integrated component connected to each other by the hinge part 70. A protruding part 43p is formed in a part of the first base member 40 where the hot-melt crush part 43 is formed. In an initial state, the first base member 40 is located on the extension of the arrangement target part 50 in the first base member 40. In this state, the wiring member 30 is attached to the first base member 40 and the second base member 60 from the same side. More specifically, an opening of the wiring member housing groove 41 on a side opposite to a bottom and an opening of the wiring member housing groove 61 on a side opposite to a bottom are directed to the same direction. Thus, the wiring member 30 is housed in the wiring member housing grooves 41 and 61 through the openings directed to the same side. Thus, an operation of wiring the wiring member 30 in the first base member 40 and the second base member 60 and an operation of housing the wiring member 30 in the wiring member housing grooves 41 and 61 are performed easily. Thus, when assumed is an operation of a device for automation such as a robot performing the operation of wiring the wiring member 30 in the first base member 40 and the second base member 60, the operation can be simplified. The operation of wiring the wiring member 30 in the first base member 40 and the second base member 60 and an operation of housing the wiring member 30 in the wiring member housing grooves 41 and 61 may be manually performed, or automatically performed by a robot, for example.

Figure 9:
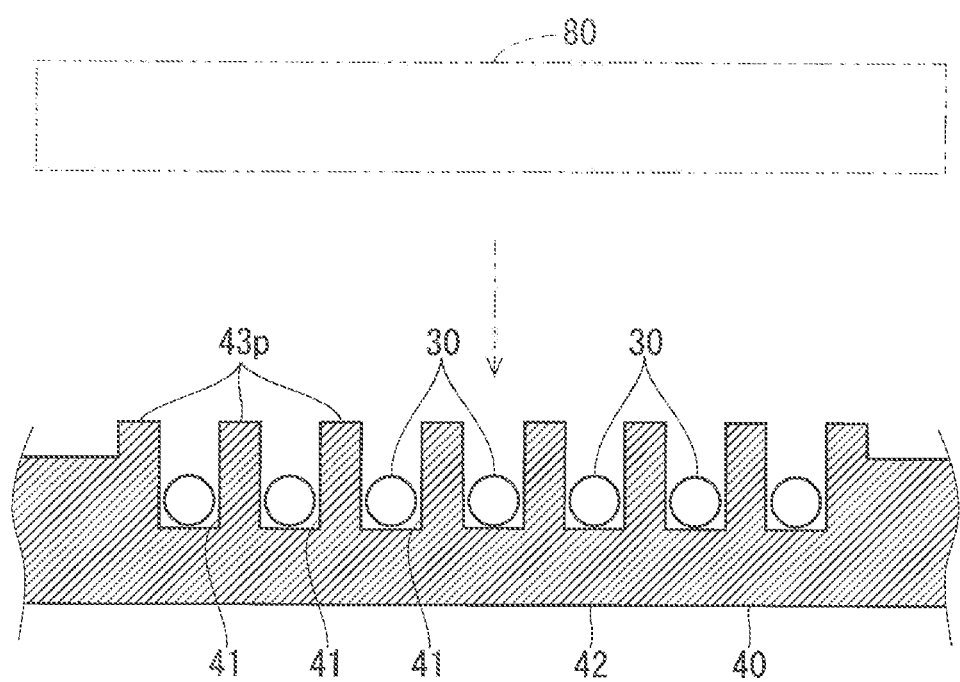
FIG. 9 is an explanation view illustrating a process of forming a hot-melt crush part.
Figure 10:
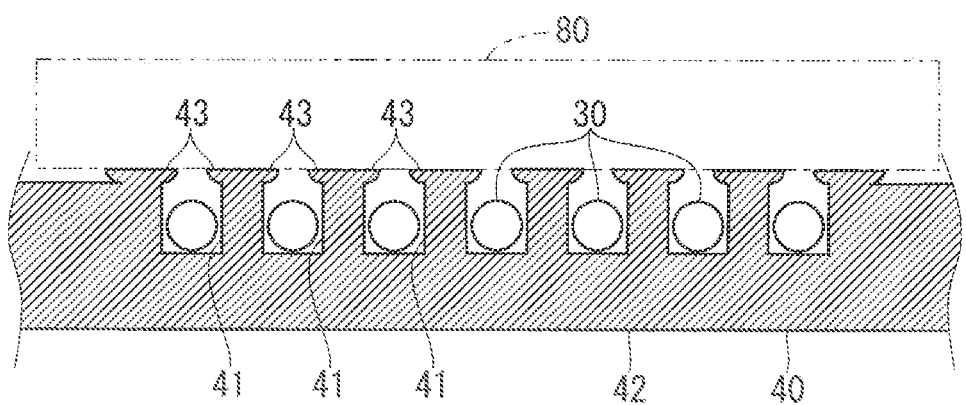
FIG. 10 is an explanation view illustrating a process of forming the hot-melt crush part.

Subsequently, as illustrated in FIG. 9 and FIG. 19, a hot-melt head 80 heated to a temperature capable of softening the protruding part 43p in the first base member 40 is pressed against the protruding part 43p. Then, the protruding part 43p is softened by the hot-melt head 80, and is crushed. The softened and crushed protruding part 43p is pressed and spread to an upper side of the opening in the wiring member housing groove 41 to constitute the hot-melt crush part 43. Accordingly, the opening of the wiring member housing groove 41 is narrowed or closed. The hot-melt head 80 is a device having a tip surface which can have contact with the plurality of protruding parts 43p and heated by a heating part such as a heater.

Accordingly, the plurality of wiring members 30 are housed and held in the wiring member housing groove 41. When the hot-melt crush part 43 is not welded to the wiring member 30 in this state, the wiring member 30 can move along the extension direction thereof in the wiring member housing groove 41.

In a state immediately after the wiring member 30 is held by the first base member 40 and the second base member 60, the second base member 60 is in the first state of holding the part of the wiring member 30 extending from the arrangement target part 50 on the extension of the arrangement target part 50 (refer to the second base member 60 illustrated by dashed-two dotted lines in FIG. 6 and FIG. 8).

Subsequently, the hinge part 70 is bended, and the second base member 60 is bended with respect to the arrangement target part 50 of the first base member 40. In this state, the second base member 60 is in the second state of bending the part of the wiring member 30 extending from the arrangement target part 50 with respect to the arrangement target part 50 and holding the part thereof (refer to the second base member 60 illustrated by solid lines in FIG. 7 and FIG. 8). In the state where the hinge part 70 is bended, the wiring member 30 passes closer to a side of an outer periphery with respect to the hinge part 70. Thus, a distance from the first base member 40 and the second base member 60 is larger in the second state than in the first state. When the wiring member 30 is movably housed in the wiring member housing groove 41, the wiring member 30 can move in the wiring member housing groove 41 so that the wiring member 30 is transmitted between the first base member 40 and the second base member 60, thus the operation of bending the hinge part 70 can be easily performed. After the wiring member integrated module 20 is manufactured, the operation of bending the hinge part 70 may be performed in a stage before the present wiring member integrated module 20 is transported to a position where an automobile is assembled or may also be performed in a position where the wiring member integrated module 20 is assembled to an automobile.

According to live wiring member integrated module 20 having such a configuration, in a state where the second base member 60 is kept in the first state, the second base member 60 holds the part of the wiring member 30 extending from the arrangement target part 50 on the extension of the arrangement target part 50. Thus, the wiring member 30 is easily held by the arrangement target part of the first base member 40 and the second base member 60. When the state of the second base member 60 is changed to the second state in the state where the wiring member 30 is held in the first base member 40 and the second base member 60, the wiring member 30 is held in a bended state. Thus, the wiring member 30 can be easily held in the bended state.

The wiring member integrated module 20 is a panel component incorporated into the door 10, thus can hold the wiring member 30 easily in a bended state so that the wiring member 30 is disposed along the main surface and the side surface of the door 10.

The first base member 40 and the second base member 60 are connected to each other via the hinge part 70, thus the wiring member 30 is easily held by the first base member 40 and the second base member 60. The second base member 60 is bended with respect to the first base member 40, thus a posture of the second base member 60 is easily changed from the first state to the second state.

[Modification Example]

Various modification examples are described based on a premise of the embodiment described above.

The wiring member integrated module may further include a fixing part for keeping the second base member in the second state with respect to the first base member. Accordingly, the second base member 60 is kept in the second state.

Any of an example of fixing the first base member 40 to the second base member 60 and an example of fixing the first base member 40 to the fixing target component may be applied to the fixing part.

Figure 11:
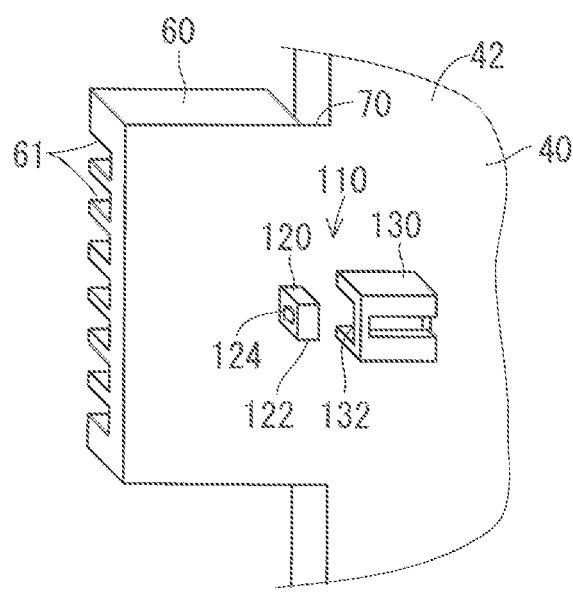
FIG. 11 is a perspective view illustrating a base member fixing part according to a first modification example.
Figure 12:
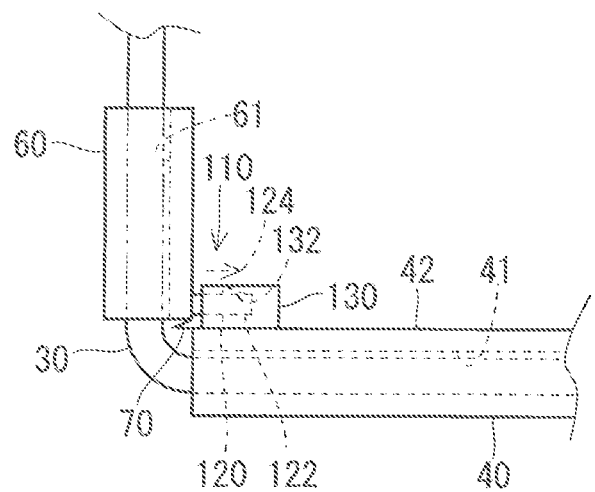
FIG. 12 is an explanation view illustrating the base member fixing part according to the modification example described above.

Described is the example of fixing the first base member 40 to the second base member 60. FIG. 11 is a perspective view illustrating a base member fixing part 110 according to a first modification example, and FIG. 12 is an explanation view illustrating the base member fixing part 110 according to the first modification example.

The base member fixing part 110 fixes the second base member 60 to the first base member 40. More specifically, the base member fixing part 110 includes a locking protrusion part 120 and a locking receiving part 130. The locking protrusion part 120 is formed on one of the first base member 40 and the second base member 40, and the locking receiving part 130 is formed on the other one of the first base member 40 and the second base member 60. Description herein is an example of forming the locking protrusion part 120 on the second base member 60 and forming the locking receiving part 130 on the first base member 40.

The locking protrusion part 120 is formed to protrude on a surface of the second base member 60 on a side opposite to a surface thereof holding the wiring member 30. The locking protrusion part 120 includes a locking protrusion body part 122 and a concave part 124. The locking protrusion body part 122 is formed into a rectangular parallelepiped shape. The concave part 124 protrudes on one main surface of the locking protrusion body part 122. The concave part 124 is formed into a shape so that a protrusion dimension thereof gradually decreases toward a tip side of the locking protrusion body part 122.

The locking receiving part 130 is formed to protrude on a surface of the first base member 40 on a side opposite to a surface thereof holding the wiring member 30. A fitting hole 132 in which the locking protrusion part 120 can be fitted is formed in the locking receiving part 130. The fitting hole 132 is opened on a side of the second base member 60. A groove to which the concave part 124 described above can be locked is formed in a part of a periphery of the locking receiving part 130.

The locking protrusion part 120 is fitted in the fitting hole 132 of the kicking receiving part 130 in the state where the second base member 60 is bended with respect to the first base member 40 and enters the second state. In this state, the convex part 124 is locked to the groove 134 so as not to come out of the groove 134. Accordingly, the second base member 60 is fixed to the first base member 40 in the state where the posture of the second base member 60 is changed to the second state.

According to this modification example, the second base member 60 is fixed to the first base member 40, thereby being kept in the second state, thus the second base member 60 can be kept in the second state in a state before the wiring member integrated module 20 is assembled to a target component.

The locking protrusion part 120 is fit in the fitting hole 132 formed in the locking receiving part 130, thus the second base member 60 is easily kept in the second state.

The configuration for fixing the second base member 60 to the first base member 40 is not limited to that in the example described above. For example, also applicable is a configuration of fixing the first base member 40 to the second base member 60 while keeping the second state by welding or bonding.

Figure 13:
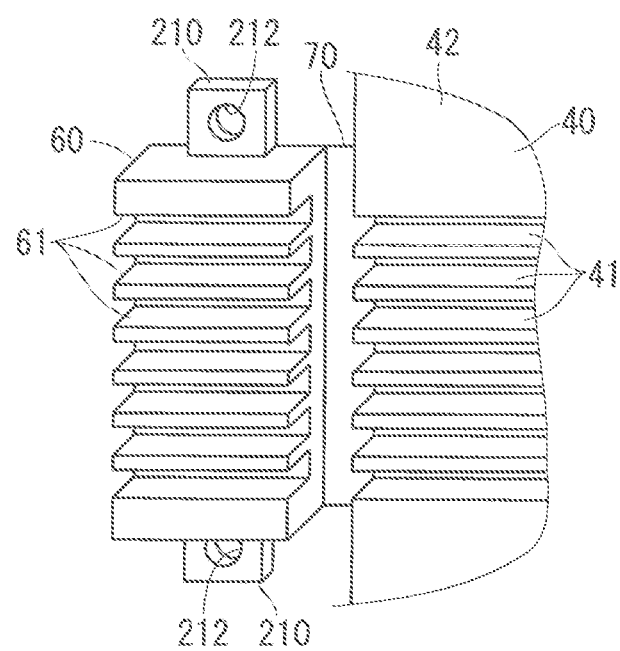
FIG. 13 is a perspective view illustrating a fixing target component fixing part according to a second modification example.
Figure 14:
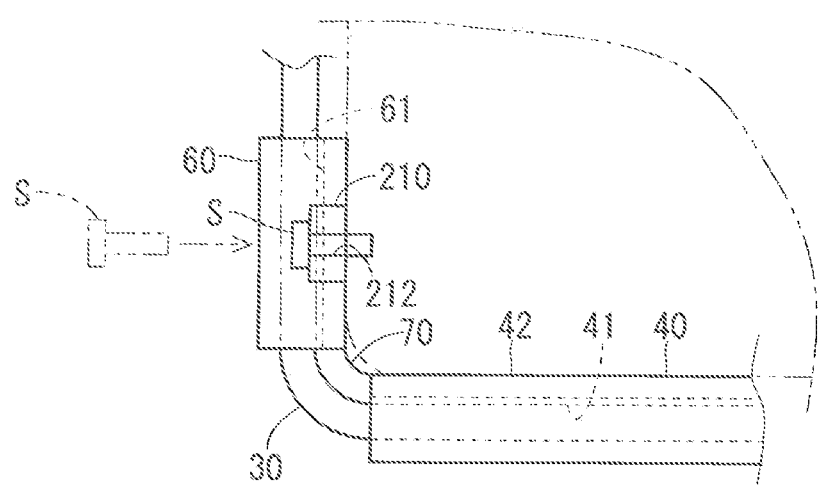
FIG. 14 is an explanation view illustrating the fixing target component fixing part according to the modification example described above.

Described is the example of fixing the first base member 40 to a fixing target component. FIG. 13 is a perspective view illustrating a fixing target component fixing part 210 according to a second modification example, and FIG. 14 is an explanation view illustrating the fixing target component fixing part 210 according to the second modification example.

The fixing target component fixing part 210 is a part provided on the second base member 60, and fixed to the metal panel 12 which is a fixing target component of the first base member 40.

The fixing target component fixing part 210 is provided on a side part of the second base member 60, herein, both side parts of the second base member 60. The fixing target component fixing part 210 is formed in a plate-like part of the second base member 60 protruding outside in a width direction. A screw insertion hole 212 is formed in the fixing target component fixing part 210.

Then, the first base member 40 is attached to the metal panel 12. At the same time or around the time thereof, the state of the second base member 60 is changed to the second state. Subsequently, a screw S is inserted into the screw insertion hole 212, and is screwed to a screw hole formed in the metal panel 12. Accordingly, the second base member 60 is fixed to the metal panel 12 and kept in the second state.

According to this modification example, when the fixing target component fixing part 210 is fixed to the fixing target component, the second base member 60 is kept in the second state.

The second base member 60 is kept in the second state by a screw fixation.

The configuration for fixing the second base member 60 to the fixing target component is not limited to that in the example described above. For example, also applicable is a configuration of fixing the first base member 40 to the fixing target component by a fitting structure, welding, or bonding, and as a result, keeping the second base member 60 in the second state with respect to the first base member 40.

The above embodiment describes the example of connecting the first base member 40 and the second base member 60 via the hinge part 70, however, the first base member 40 and the second base member 60 may be connected to each other via a weakened part.

Figure 16:
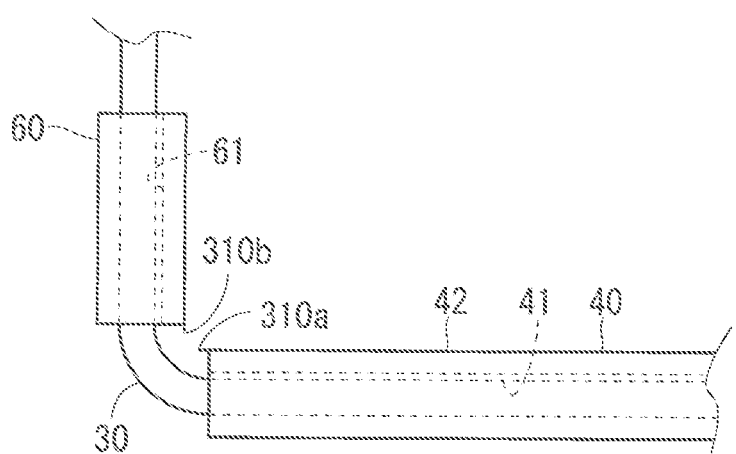
FIG. 16 is an explanation view illustrating the second base member in a second state in the third modification example described above.

FIG. 15 is a perspective view illustrating a portion of connecting the first base member 40 and the second base member 60 according to a third modification example, and FIG. 16 is an explanation view illustrating the second base member 60 in the second state in the third modification example.

The first base member 40 and the second base member 60 are connected to each other via a weakened part 310. The weakened part 310 is a part which can be fractured more easily than the other part (the first base member 40 and the second base member 60, for example). Herein, the weakened part 310 is formed to be thinner than the first base member 40 and the second base member 60, and is easily fractured. A part where an intermittent slit is formed, a part where a groove is formed, and a part where a notch causing a fracture is formed may be adopted as the weakened part.

In this modification example, when the wiring member 30 is wired in the first base member 40 and the second base member 60, the first base member 40 and the second base member 60 remain to be connected to each other via a weakened part 310. Accordingly, the wiring member 30 is easily wired in the first base member 40 and the second base member 60, and the first base member 40 and the second base member 60 can easily hold the wiring member 30 so as to be in the first state.

When the state of the second base member 60 is changed to the second state, the weakened part 310 is fractured, and the second base member 60 is bended with respect to the first base member 40. Fracture traces 310a and 310b where the weakened part 310 is fractured are assumed to be formed in the first base member 40 and the second base member 60.

According to this modification example, the first base member 40 and the second base member 60 are connected to each other via the weakened part 310, thus the wiring member 30 is easily held by the first base member 40 and the second base member 60. When the weakened part 310 is fractured, the state of the second base member 60 is easily changed to the second state.

In the state where the weakened part 310 is fractured, the first base member 40 is not constrained by the second base member 60, thus this configuration is excellent in a degree of freedom of a position and a posture in fixing the second base member 60 to the fixing target component.

Each configuration described in the above embodiments and modification examples thereof can be appropriately combined as long as they are not contradictory. For example, in the third modification example, it is also applicable that at least one of the first and second modification examples is applied and the second base member 60 is fixed to the first base member 40 or the fixing target component.

EXPLANATION OF REFERENCE SIGNS 10 door
12 metal panel
13 metal outer panel
14 metal inner panel
15 opening
18 electrical component
20 wiring member integrated module
30 wiring member
40 first base member
41 wiring member housing groove
42 plate-like part
43 hot-melt crush part
43p protruding part
44 housing space forming part
46 wiring support protrusion part
48 wiring support protrusion part
50 arrangement target part
60 second base member
61 wiring member housing groove
70 hinge part
80 hot-melt head
110 base member fixing part
120 locking protrusion part
122 locking protrusion body part
124 concave part
130 locking receiving part
132 fitting hole
134 groove
210 fixing target component fixing part
212 screw insertion hole
310 weakened part
310a fracture trace
310b fracture trace
S screw

The invention claimed is:

1. A wiring member integrated module, comprising:
a wiring member;
a first base member including an arrangement target part holding a part of the wiring member;
a second base member whose state can be changed from a first state where a part of the wiring member extending from the arrangement target part is held on an extension of the arrangement target part to a second state where the part is held in a bended state with respect to the arrangement target part; and
a hinge part bendably connecting the second base member to the first base member wherein
the first base member is a panel component incorporated into a door of a vehicle so as to be attached to an opening of an inner panel in a door panel including an outer panel and the inner panel, and
the second base member is a member disposed along an outward side surface on a front side of the door panel.

2. A wiring member integrated module comprising:
a wiring member;
a first base member including an arrangement target part holding a part of the wiring member; and
a second base member whose state can be changed from a first state where a part of the wiring member extending from the arrangement target part is held on an extension of the arrangement target part to a second state where the part is held in a bended state with respect to the arrangement target part, wherein
in the first state, the first base member and the second base member are connected to each other via a weakened part which can be fractured more easily than another part.

3. A wiring member integrated module comprising:
a wiring member;
a first base member including an arrangement target part holding a part of the wiring member; and
a second base member whose state can be changed from a first state where a part of the wiring member extending from the arrangement target part is held on an extension of the arrangement target part to a second state where the part is held in a bended state with respect to the arrangement target part, wherein
in the second state, fracture traces are formed in the first base member and the second base member, respectively.

4. The wiring member integrated module according to claim 1, further comprising
a fixing part for keeping the second base member in the second state with respect to the first base member.

5. The wiring member integrated module according to claim 4, wherein
the fixing part includes a base member fixing part fixing the second base member to the first base member.

6. A wiring member integrated module, comprising:
a wiring member;
a first base member including an arrangement target part holding a part of the wiring member;
a second base member whose state can be changed from a first state where a part of the wiring member extending from the arrangement target part is held on an extension of the arrangement target part to a second state where the part is held in a bended state with respect to the arrangement target part; and a fixing part for keeping the second base member in the second state with respect to the first base member, wherein the first base member is a panel component incorporated into a door of a vehicle so as to be attached to an opening of an inner panel in a door panel including an outer panel and the inner panel, the second base member is a member disposed along an outward side surface on a front side of the door panel, the fixing part includes a base member fixing part fixing the second base member to the first base member, and the base member fixing part includes a locking protrusion part formed to protrude from one of the first base member and the second base member and a locking receiving part formed on another one of the first base member and the second base member to fit the locking protrusion part in the locking receiving part.

7. The wiring member integrated module according to claim 4, wherein the fixing part includes a fixing target component fixing part provided in the second base member and fixed to a fixing target component of the first base member.

8. The wiring member integrated module according to claim 7, wherein the fixing target component fixing part is a part screwed to the fixing target component.

9. The wiring member integrated module according to claim 2, further comprising a fixing part for keeping the second base member in the second state with respect to the first base member.

10. The wiring member integrated module according to claim 9, wherein the fixing part includes a base member fixing part fixing the second base member to the first base member.

11. The wiring member integrated module according to claim 10, wherein the base member fixing part includes a locking protrusion part formed to protrude from one of the first base member and the second base member and a locking receiving part formed on another one of the first base member and the second base member to fit the locking protrusion part in the locking receiving part.

12. The wiring member integrated module according to claim 9, wherein the fixing part includes a fixing target component fixing part provided in the second base member and fixed to a fixing target component of the first base member.

13. The wiring member integrated module according to claim 12, wherein the fixing target component fixing part is a part screwed to the fixing target component.

14. The wiring member integrated module according to claim 3, further comprising a fixing part for keeping the second base member in the second state with respect to the first base member.

15. The wiring member integrated module according to claim 14, wherein the fixing part includes a base member fixing part fixing the second base member to the first base member.

16. The wiring member integrated module according to claim 15, wherein the base member fixing part includes a locking protrusion part formed to protrude from one of the first base member and the second base member and a locking receiving part formed on another one of the first base member and the second base member to fit the locking protrusion part in the locking receiving part.

17. The wiring member integrated module according to claim 14, wherein the fixing part includes a fixing target component fixing part provided in the second base member and fixed to a fixing target component of the first base member.

18. The wiring member integrated module according to claim 17, wherein the fixing target component fixing part is a part screwed to the fixing target component.

19. The wiring member integrated module according to claim 5, wherein the base member fixing part includes a locking protrusion part formed to protrude from one of the first base member and the second base member and a locking receiving part formed on another one of the first base member and the second base member to fit the locking protrusion part in the locking receiving part.

* * * * *